United States Patent Office 2,862,921
Patented Dec. 2, 1958

2,862,921

ERYTHROMYCIN ESTERS

Roger E. Booth, Kalamazoo Township, Kalamazoo County, Jack K. Dale, Kalamazoo, and Maxton F. Murray, Kalamazoo Township, Kalamazoo County, Mich., assignors to The Upjohn Company, Kalamazoo, Mich., a corporation of Michigan No Drawing. Application August 13, 1953
Serial No. 374,114

19 Claims. (Cl. 260—210)

This invention relates to chemical compounds and more particularly, to novel esters of erythromycin and to a process for the preparation thereof.

Erythromycin is an antibiotic exhibiting significant activity against Gram-positive organisms, Gram-negative organisms, and large viruses. The antibiotic is obtained by growing an erythromycin-producing strain of *Streptomyces erythreus* (NRRL 2338) on a culture medium as described in Union of South Africa Patent No. 16,073 (granted March 23, 1953) and Antibiotics and Chemotherapy, 2, 281–3 (1952). It has the following structural formula (Chemical and Engineering News, October 22, 1956, page 5138):

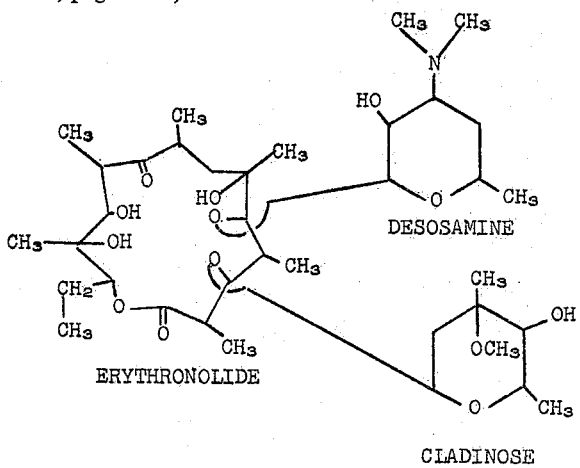

Due to its bitter taste, erythromycin possesses limited utility for oral administration. Liquid preparations containing the antibiotic have proved to be unsatisfactory since attempts to mask this unpleasant taste have been unsuccessful. Prior to this invention, therefore, oral administration of erythromycin has been limited to capsules and tablets.

It is an object of the present invention to provide novel esters of erythromycin. Another object of the invention is to provide esters of erythromycin possessing antibacterial activity corresponding to that of erythromycin. Another object of the invention is to provide erythromycin esters which are more palatable than erythromycin. A further object of the invention is to provide a method for the preparation of these novel erythromycin esters.

It has now been found that by reacting erythromycin with an acid chloride of the formula

wherein R represents a monovalent alkyl, cycloalkanealkyl, or alkenyl radical containing at least seven carbon atoms, novel and therapeutically-valuable erythromycin alkanoates, alkenoates and cycloalkanealkanoates containing at least eight carbon atoms in each acyl radical are obtained. The reaction is conducted at temperatures ranging from about zero degrees centigrade up to about 45 degrees centigrade and preferably between twenty and thirty degrees centigrade. When the molar ratio of acid chloride to erythromycin is about 1:1, an erythromycin mono-ester is obtained. The erythromycin and acid chloride react in equivalent proportions, for example, one mole of erythromycin reacts with one mole of acid chloride to form an erythromycin mono-ester and with two moles of acid chloride to form an erythromycin di-ester. Ordinarily, therefore, equivalent proportions of acid chloride and erythromycin are used.

The monoesters have the following formula:

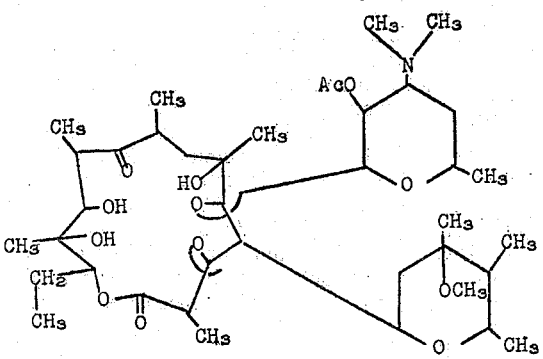

wherein Ac is the acyl radical of a pharmacologically acceptable hydrocarbon carboxylic acid containing at least eight and not more than eighteen carbon atoms selected from the group consisting of alkanoic, alkenoic, and cycloalkanoic acids. The structure of the diesters is not certain since both the erythronolide and cladinose moieties contain a secondary hydroxyl group that theoretically could be esterified. Since, however, it is known that cladinose form a diester, it is believed that the second acyl group of the erythromycin diesters is in the cladinose moiety.

The preparation of the erythromycin esters by reacting erythromycin with an acid chloride is usually carried out in a solvent. Any inert solvent which is a solvent for one of the reactants and advantageously for both reactants can be used. The term "inert solvent" is used herein in accordance with the second definition of "solvent" in Hackh's Chemical Dictionary, third edition, to mean "a liquid which dissolves another substance without any change in chemical composition," in contradiction to those types of solvents which dissolve by a chemical reaction. Suitable solvents include chloroform, ethylene dichloride, methylene chloride, carbon tetrachloride, isopropyl ether, dioxan, and the like, methylene chloride being preferred.

The reaction between erythromycin and the acid chloride is advantageously conducted in the presence of an acid acceptor such as a tertiary amine possessing a pKa value greater than 8.9, the pKa value of erythromycin. Free erythromycin esters are thus obtained because the acid acceptors, rather than the erythromycin or the erythromycin ester thus-formed, reacts with the hydrogen chloride produced during the reaction to form a salt therewith. The preferred acid acceptors are triethylamine and triisopropylamine although satisfactory results are obtained by using other tertiary amines having a pKa value greater than 8.9, such as, for example, tri-n-propylamine, tri-n-butylamine, triisobutylamine, 2-dimethylaminononane, ethyldimethylamine, benzyldiethylamine, 1-ethylpiperidine, 1-n-butylpiperidine, 1-ethyl-2-methylpiperidine, 1-n-butyl-2-methylpiperidine, 1-methylpyrrolidine, 1-n-propylpyrrolidine, 4-ethylmorpholine, 4-isobutylmorpholine, 1,4-dimethylpiperazine, 1,4-diethylpiperazine, and the like.

In a modification of this procedure, erythromycin is initially reacted with an acid chloride, and a basic material having a pKa value greater than 8.9 is then added to the reaction mixture to substantially completely remove the hydrogen chloride from the erythromycin ester reaction product. In addition to the basic materials mentioned above, there can be used the corresponding primary and secondary amines, such as methylamine, dimethylamine, diethylamine, piperidine, and the like, and ammonia, and inorganic bases such as the alkali-metal hydroxides.

Due to the presence of a tertiary amino group within the erythromycin molecule, the erythromycin esters of the invention form acid addition salts. Examples of salt-forming acids are hydrochloric acid, sulfuric acid, acetic acid, propionic acid, lauric acid, stearic acid, oleic acid, tartaric acid, citric acid, benzoic acid, phthalic acid, salicylic acid, lactic acid, and the like.

The novel erythromycin esters of the invention are characterized by an antibacterial spectrum similar to that exhibited by erythromycin. These esters are useful as active ingredients of stable medicaments suitable for parenteral, topical, and oral administration. They are particularly valuable for use in stable, liquid, oral medicaments of improved palatability. The value of a palatable, liquid, oral erythromycin medicament cannot be overemphasized since this method of administration is not only very convenient but also well suited for administration to infants and young children incapable of swallowing tablets.

The following examples illustrate the products and process of the present invention but are not to be construed as limiting. The molecular weight of erythromycin is assumed to be 720.

EXAMPLE 1

*Erythromycin mono(cyclopentanepropionate)*

To a solution of 145 grams (0.2 mole) of erythromycin in 500 milliliters of anhydrous diethyl ether is gradually added, with stirring, 34.0 grams (0.21 mole) of cyclopentanepropionyl chloride. A fine, white precipitate is formed during the addition of the chloride. The mixture is stirred for an additional ten minutes and the precipitate is recovered by filtration (Büchner funnel). Residual ether is removed by passing air through the funnel and the product is dissolved by passing about 3.5 liters of water through the funnel. The solution thus obtained is neutralized with ten percent ammonium hydroxide solution. The resulting heavy precipitate is recovered by filtration, washed with two one-liter portions of water and air-dried. The product weighs 110 grams (77 percent yield) and melts between 119 and 125 degrees centigrade. The following elemental analysis is obtained: C, 62.25, 62.09; H, 9.18, 9.11; N, 1.92, 1.79.

EXAMPLE 2

*Erythromycin monolaurate*

To a well-stirred solution of 2.30 grams (10.5 millimoles) of lauroyl chloride and 1.21 grams (12.0 millimoles) of triethylamine in fifty milliliters of methylene chloride is added 7.20 grams (10.0 millimoles) of erythromycin. After a short time complete solution is obtained and stirring is then discontinued. The solution is allowed to stand overnight. The solution is diluted to 250 milliliters by the addition of methylene chloride and washed three times with 100-milliliter portions of water followed by two washes with five percent sodium bicarbonate solution. The organic layer is dried over anhydrous sodium sulfate and filtered, the solvent being removed under diminished pressure. The product is dried to constant weight at room temperature in a vacuum desiccator. The erythromycin monolaurate thus obtained is glassy in character, weighs 8.90 grams (98 percent yield) and possesses an optical rotation of $[\alpha]_D^{23}$ minus 63 degrees in ethyl alcohol. The following analysis is obtained: N, 1.61%.

EXAMPLE 3

*Erythromycin dilaurate*

To a solution of 0.88 gram (4.0 millimoles) lauroyl chloride and 0.6 gram (7.6 millimoles) pyridine in thirty milliliters of methylene chloride is added 1.44 grams (2.0 millimoles) of erythromycin, with stirring. Complete solution is soon obtained and stirring is then discontinued. After standing three days, the solution is washed twice with 25-milliliter portions of five percent sodium bicarbonate solution, and dried over anhydrous sodium sulfate. The solvent is removed under diminished pressure and the residue is dried to constant weight in vacuo. The product is glassy in character and weighs 2.12 grams (97 percent yield).

EXAMPLE 4

*Erythromycin monostearate*

Following the procedure described in Example 2 except for the substitution of lauroyl chloride by 3.18 grams (10.5 millimoles) of stearoyl chloride and the replacement of triethylamine by 1.24 grams (11.0 millimoles) of 1-ethylpiperidine, erythromycin monostearate is obtained.

EXAMPLE 5

*Erythromycin monooleate*

Following the procedure described in Example 2 except for the substitution of lauroyl chloride by 2.17 grams (10.0 millimoles) of oleoyl chloride and the replacement of triethylamine by 0.85 gram (10.0 millimoles) of 1-methylpyrrolidine, erythromycin monoöleate is obtained.

EXAMPLE 6

*Erythromycin monocaprylate*

Following the procedure described in Example 2 except for the substitution of lauroyl chloride by 1.71 grams (10.5 millimoles) of caprylyl chloride and the replacement of triethylamine by 1.72 grams (12.0 millimoles) of 4-isobutylmorpholine, erythromycin monocaprylate is obtained.

EXAMPLE 7

*Erythromycin mono(2,5-dimethyl-4-hexenoate)*

Following the procedure described in Example 2 except for the substitution of lauroyl chloride by 1.61 grams (10.0 millimoles) of 2,5-dimethyl-4-hexenoyl chloride, Staudinger et al., Helv. Chim. Acta, 7, 390–406 (1924), and the replacement of triethylamine by 2.04 grams (11.0 millimoles) of tri-n-butylamine, erythromycin mono(2,5-dimethyl-4-hexenoate) is obtained.

EXAMPLE 8

*Erythromycin mono(cyclopentanetridecanoate)*

Following the procedure described in Example 2 except for the substitution of lauroyl chloride by 3.16 grams (10.5 millimoles) of cyclopentanetridecanoyl chloride, Burschkies, Ber., 73, 405–8 (1940), and the replacement of triethylamine by 1.20 grams (10.5 millimoles) of 1,4-dimethylpiperazine, erythromycin mono (cyclopentanetridecanoate) is obtained.

EXAMPLE 9

*Erythromycin mono(α-ethyllaurate)*

Following the procedure described in Example 2 except for the substitution of lauroyl chloride by 2.59 grams (10.5 millimoles) of α-ethyllauroyl chloride, erythromycin mono(α-ethyllaurate) is obtained.

Similarly, other erythromycin esters are prepared such as, for example, erythromycin mono(dimethylcaprylate), erythromycin monopelargonate, erythromycin monohendecanoate, erythromycin mono(α-isoamylisoenanthate), erythromycin monotridecanoate, erythromycin monopentadecanoate, erythromycin monopalmitate, erythromycin mono(α-ethylmyristate), erythromycin monomargarate, erythromycin mononeneoate, erythromycin mono(2-decenoate), erythromycin mono(10-hendecenoate), erythromycin mono(2-dodecenoate), erythromycin mono (2-tridecenoate), erythromycin mono(cyclohexaneacetate), erythromycin mono(α-ethylcyclopentaneacetate), erythromycin mono(cyclopentanevalerate), erythromycin mono(cyclohexanevalerate), erythromycin mono(1,2,2,3-tetramethylcyclopentanepropionate), erythromycin mono (cyclopentanehendecanoate), and the like.

Additional erythromycin esters such as erythromycin distearate, erythromycin dioleate, erythromycin dicaprylate, and the like, are obtained by reacting erythromycin with two moles of the corresponding acid chloride.

Likewise by a selective esterification procedure wherein one hydroxy group of the erythromycin molecule is esterified with an acid chloride followed by esterification of another hydroxy group of the erythromycin molecule with a dissimilar acid chloride, mixed erythromycin esters can be prepared such as, for example, erythromycin mono(cyclopentanepropionate) monolaurate, erythromycin mono(cyclopentanepropionate) monostearate, erythromycin monolaurate monostearate, erythromycin monolaurate monooleate, erythromycin monolaurate monocaprylate, and the like.

It is to be understood that the invention is not to be limited to the exact details of operation as shown and described, since obvious modifications and equivalents will be apparent to one skilled in the art, and the invention is therefore to be limited only by the scope of the appended claims.

We claim:

1. A process which comprises reacting erythromycin with a pharmacologically acceptable acid chloride of the formula

wherein R represents a monovalent radical selected from the group consisting of alkyl, cycloalkanealkyl and alkenyl radicals containing at least seven and not more than seventeen carbon atoms to produce the corresponding erythromycin ester.

2. A process which comprises reacting one mole of erythromycin with at least one mole of a pharmacologically acceptable alkanoyl chloride containing at least eight and not more than eighteen carbon atoms to produce an alkanoate ester of erythromycin.

3. A process which comprises reacting one mole of erythromycin with about one mole of a pharmacologically acceptable alkanoyl chloride containing at least eight and not more than eighteen carbon atoms to produce a monoalkanoate ester of erythromycin.

4. A process which comprises reacting erythromycin with a pharmacologically acceptable alkanoyl chloride containing at least eight and not more than eighteen carbon atoms in the presence of a tertiary amine having a pKa value greater than 8.9 to produce an alkanoate ester of erythromycin.

5. A process which comprises reacting erythromycin with a pharmacologically acceptable alkanoyl chloride containing at least eight and not more than eighteen carbon atoms and neutralizing the reaction mixture with a base having a pKa value greater than 8.9 to produce an alkanoate ester of erythromycin.

6. A process which comprises reacting one mole of erythromycin with at least one mole of a pharmacologically acceptable cycloalkanealkanoyl chloride containing at least eight and not more than eighteen carbon atoms to produce a cycloalkanealkanoate ester of erythromycin.

7. A process which comprises reacting one mole of erythromycin with about one mole of a pharmacologically acceptable cycloalkanealkanoyl chloride containing at least eight and not more than eighteen carbon atoms to produce a monocycloalkanealkanoate ester of erythromycin.

8. An ester of erythromycin and a pharmacologically acceptable acid containing at least eight and not more than eighteen carbon atoms selected from the group consisting of alkanoic, alkenoic, and cycloalkanoic acids, and the pharmacologically acceptable acid addition salts thereof.

9. An ester of erythromycin and a pharmacologically acceptable acid, said acid being an alkanoic acid containing at least eight and not more than eighteen carbons.

10. A compound having the formula:

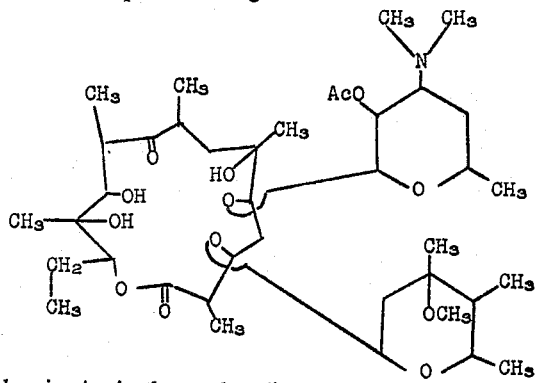

wherein Ac is the acyl radical of a pharmacologically acceptable hydrocarbon carboxylic acid containing at least eight and not more than eighteen carbon atoms selected from the group consisting of alkanoic, alkenoic, and cycloalkanoic acids.

11. The compound of claim 10 in which Ac is the acyl radical of an alkanoic acid containing at least eight and not more than eighteen carbon atoms.

12. The compound of claim 10 in which Ac is the acyl radical of a cycloalkanoic acid containing at least eight and not more than eighteen carbon atoms.

13. The compound of claim 10 in which Ac is the acyl radical of an alkenoic acid containing at least eight and not more than eighteen carbon atoms.

14. A cyclopentanepropionate ester of erythromycin.

15. A mono(cyclopentanepropionate) ester of erythromycin.

16. A laurate ester of erythromycin.

17. Erythromycin monolaurate.

18. A stearate ester of erythromycin.

19. Erythromycin monostearate.

References Cited in the file of this patent

UNITED STATES PATENTS

| | | |
|---|---|---|
| 2,378,449 | Tishler | June 11, 1945 |
| 2,483,885 | Crooks | Oct. 4, 1949 |
| 2,653,899 | Bunch et al. | Sept. 29, 1953 |
| 2,662,906 | Edgerton | Dec. 15, 1953 |

OTHER REFERENCES

Antibiotics Annual 1953–1954 (1953), pp. 500–513.

McGuire et al.: "Antibiotics & Chemotherapy," June 1952, vol. II, No. 6, pp. 281–283.

Clark: "Antibiotics & Chemotherapy," July 1953, pp. 663–671.

Hasbrouck et al.: "Antibiotics & Chemotherapy," October 1953, pp. 1040 and 1053.

Flynn et al.: J. A. C. S., June 20, 1954, pp. 3121–3125.

Ross et al.: Clinical Proc. Childrens Hosp. (Washington, D. C.) August 1951, pp. 243–246.

U. S. Dispensatory, 24th ed., pp. 963–964, published by J. B. Lippincott Co.